(12) United States Patent
Janke et al.

(10) Patent No.: US 7,290,289 B2
(45) Date of Patent: Oct. 30, 2007

(54) PROCESSOR WITH SEVERAL CALCULATING UNITS

(75) Inventors: Marcus Janke, Munich (DE); Peter Laackmann, Munich (DE)

(73) Assignee: Infineon Technologies AG (DE)

( * ) Notice: Subject to any disclaimer, the term of this patent is extended or adjusted under 35 U.S.C. 154(b) by 828 days.

(21) Appl. No.: 10/764,265

(22) Filed: Jan. 23, 2004

(65) Prior Publication Data

US 2004/0186979 A1    Sep. 23, 2004

Related U.S. Application Data

(63) Continuation of application No. PCT/EP02/07298, filed on Jul. 2, 2002.

(30) Foreign Application Priority Data

Jul. 26, 2001 (DE) ................................ 101 36 335

(51) Int. Cl.
*G06F 21/00* (2006.01)
(52) U.S. Cl. .................. 726/34; 713/193; 713/194; 712/223; 712/224; 712/225; 712/226; 712/227
(58) Field of Classification Search .................. 726/34; 713/193, 194; 712/223–227
See application file for complete search history.

(56) References Cited

U.S. PATENT DOCUMENTS 4,521,852 A * 6/1985 Guttag ...................... 711/163
4,932,053 A * 6/1990 Fruhauf et al. ............. 380/252
6,035,380 A * 3/2000 Shelton et al. .............. 711/163
6,040,305 A * 3/2000 Taveras et al. .......... 514/232.8

FOREIGN PATENT DOCUMENTS

| DE | 37 25 750 A1 | 2/1989 |
| EP | 1 115 094 A2 | 7/2001 |
| FR | 2 787 900 A1 | 6/2000 |

OTHER PUBLICATIONS

Barroso et al., "Piranha: A Scalable Architecture Based on Single-Chip Multiprocessing", ACM, 2000, pp. 282-293.*
Brorsson et al., "An Adaptive Chip-Multprocessor Architecture for Future Mobile Terminals", ACM, 2002, pp. 43-49.*
Nishi et al., "WP25.5 A 1GIPS 1W Single-Chip Tightly-Coupled Four-Way Multiprocessor with Architecture Support for Multiple Control Flow Execution", IEEE 2000, International Solid-State Circuits Conference.*
Masato Edahiro, et al; "A Single-Chip Multiprocessor For Smart Terminals"; IEEE Micro; vol. 20, Issue 4, Jul.-Aug. 2000.

* cited by examiner

*Primary Examiner*—Kambiz Zand
*Assistant Examiner*—Tongoc Tran
(74) *Attorney, Agent, or Firm*—Dickstein, Shapiro, LLP.

(57) ABSTRACT

A processor comprises a first calculating unit, a second calculating unit and a control means for controlling the two calculating units, such that they selectively operate in a high security mode of operation processing complementary data or in a parallel mode of operation processing independent data, or in a security mode of operation processing the same data, or that they are in a power-saving mode of operation, wherein one of the calculating units is switched off.

10 Claims, 5 Drawing Sheets

PROCESSOR WITH SEVERAL CALCULATING UNITS

CROSS-REFERENCE TO RELATED APPLICATION

This application is a continuation of copending International Application No. PCT/EP02/07298, filed Jul. 2, 2002, which designated the United States and was not published in English.

BACKGROUND OF THE INVENTION

1. Field of the Invention

The present invention refers to a processor with several calculating units and particularly to a processor with several calculating units, which can cooperate in a selectable mode of operation according to the dual rail logic.

2. Description of the Prior Art

Microprocessors and controllers, respectively, for chip card applications and other cryptographical applications often have to meet special security conditions. One of the main requirements is the security of the microprocessor against unauthorized reading out of secret information, particularly via side channel attacks. Side channel attacks occur, for example, by detecting the power consumption of a processor or by an electromagnetic or electrostatic detection of signal flows, wherein conclusions can be drawn about internal operations in the processor from the information obtained in that way. Apart from high-security tasks, a chip card controller also has to perform a plurality of conventional operations, where high performance is a big advantage and can result in an important market advantage. Examples would be applications in the mobile radio area, where the actual authentication only accounts for a very small part of the program run time. Still, for this a small portion, the full security of the authentication is required. Similarly, this holds true for electronic purses, even for the cash card, because in these applications, large parts of the program flow are also hardly security-critical, but the actual authentication however, is a high security task.

A highly secure execution of the processor kernel is, for example, possible in the so-called dual rail logic with precharge. The execution of a security microprocessor in dual rail logic with precharge is an important measure against side channel attacks, which are a big threat nowadays. However, it causes an economically disadvantageous larger area requirement in comparison to a prior art processor, and can lead to power penalties of the microprocessor due to the necessity of several clock phases. As a result, there will be a lower computing power and a lower data throughput, respectively, as well as an increased power consumption of the processor in comparison to standard architectures.

SUMMARY OF THE INVENTION

It is the object of the present invention to provide a processor with increased security, which has a higher computing power and a lesser power consumption, respectively.

In accordance with a first aspect, the present invention provides a processor, having a first calculating unit, a second calculating unit and a control means for controlling the two calculating units such that they operate selectively in a high-security mode of operation processing complementary data or in a parallel mode of operation processing independent data. Instead of the parallel mode of operation or additionally, a power saving mode of operation, where one of the calculating units is switched off, or a security mode of operation, where both calculating units process the same data in parallel, can be provided as a further mode of operation.

According to a preferred embodiment of the present invention, a processor comprises a switchable complementation means with an output, which is connected to an input of the second calculating unit, for receiving data and for selectively outputting the received data or the complement of the received data.

A processor according to the present invention can further comprise a third calculating unit and a fourth calculating unit, wherein the third calculating unit and the first calculating unit can be controlled by the control means such that they operate selectively in a high security mode, of operation processing complementary data or in a parallel mode of operation processing independent data. In a power saving mode of operation provided instead of the high security mode of operation or additionally, the third and/or the fourth calculating unit are switched off.

The first calculating unit and the second calculating unit are preferably designed such that they can process the same instructions in a time synchronous manner in the high security mode of operation. The first calculating unit and the second calculating unit are preferably disposed spatially adjacent. The processor can, for example, be a cryptography processor.

Another processor according to the present invention comprises a first calculating unit, a second calculating unit, a data source, which is connected to the first calculating unit and a second calculating unit such that data are provided to the first calculating unit and the complement of the data synchronously to the second calculating unit, and an instruction source, which comprises a pair of instructions, wherein one of the instructions of the instruction pair is intended for the first calculating unit and wherein the other instruction of the instruction unit is intended for the second calculating unit, and wherein the instruction source is connected to the first calculating unit and the second calculating unit such that the instruction intended for the first calculating unit of the instruction pair can be provided to the first calculating unit and the instruction of the instruction pair intended for the second calculating unit can be supplied synchronously to the second calculating unit.

The instruction intended for the first calculating unit and the instruction intended for the second calculating unit can be the same, when the processor is to operate in a dual rail mode of operation or in a security mode of operation, they can be different to one another when the processor is to operate in a high-security mode of operation, and one of the two instructions can shut down the calculating unit for which it is intended, when the processor is to operate in a power saving mode of operation.

It is another object of the present invention, to provide a chip card with increased security and increased computing power and/or decreased power consumption.

In accordance with another aspect, the present invention provides a chip card comprising one of the above-described processors.

The present invention is based on the knowledge that a dual rail logic can be realized by an arrangement of several processor part modules, which can be operated in different mode of operations. Advantageously, such a microprocessor contains two or another even number of CPU part modules, which are at least constructed identically in pairs. With two CPU parts, one can choose between four different modes of operation, and they can be switched during operation:

1. High-security mode of operation: One of the two CPU parts and one of the two calculating units, respectively, operates like a prior art standard processor. The second part, however, is supplied with the complementary data and processes them time-synchronized with exactly the same instructions and the same controller, wherein the calculating units operate in the precharge operation. Thereby, the two processor parts act together as one single processor with dual rail logic, they are in the high-security mode of operation. Advantageously, the complementary calculating elements are disposed spatially adjacent to one another, and preferably, they are further arranged intertwined, whereby such an arrangement can also be secured against electromagnetic radiation analysis. In the sense of this application, a processor with complementary calculating units is a processor with a power consumption independent of processed data.
2. High-power mode of operation: For programs or program parts, where a strong security against side channel attacks is not required, the high-power mode of operation is provided. In this mode of operation, the CPU parts and calculating units, respectively, are supplied with program parts to be processed in parallel and being different, respectively. Thus, an arrangement of two CPUs and processors, respectively, results, whereby the data throughput can double.
3. Power saving mode of operation: In the power saving mode of operation, one or several calculating units are deactivated, so that only one calculating unit or part of the calculating units is in operation. The smaller number of switching gates reduces the power consumption. In this mode of operation, the processor operates neither in the range of the highest security stage nor in the range of the highest power.
4. Security mode of operation: A security mode of operation is a mode of operation where the two calculating units process the same data, and by comparing the results of this processing the operation security is increased, which offers, for example, a protection against DFA (differential fault attacks).

It is an advantage of the inventive processor, that it provides the high security of a dual rail logic for security relevant programs and program parts, respectively, and a high computing power or a lower power consumption for processing less security relevant program parts, wherein it can be dynamically switched between different modes of operation, even during operation.

If in the present invention, two calculating units are mentioned, respectively, n·2 calculating units can be used, whereby n is a natural number.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
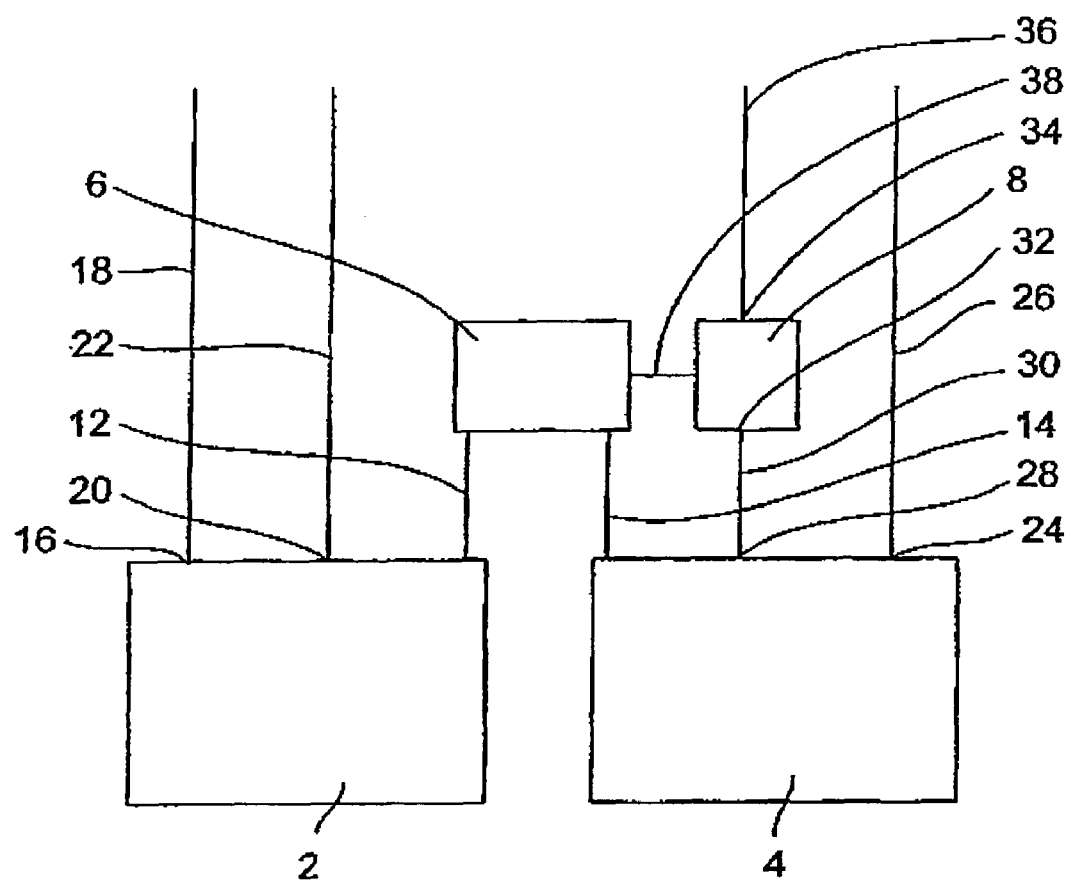
FIG. 1 is a schematical representation of an embodiment of the present invention.

FIG. 1 is a schematical representation of the part of a processor relevant for the present invention according to an embodiment of the present invention. The processor comprises a first calculating unit 2, a second calculating unit 4, a control means 6 and a complementation means 8. In the case of two parallel data lines, an inverter can form the complementation means 8. The control means 6 is connected effectively to the first calculating unit 2 via control line 12, and to the second calculating unit 4 via a control line 40. The first calculating unit 2 comprises an instruction input 16, which is connected via line 18 to a not-illustrated instruction source, such as a program memory in form of a ROM (read only memory), a RAM (random access memory) or a hard disc, as well as a data input 20, which is connected to a not-illustrated data source, such as a data memory or an interface, via data line 22. The second calculating unit 4 comprises an instruction input 24, which is connected via an instruction line 26 to the not-illustrated instruction source, to which the first calculating unit is connected via the instruction line 18, or to another instruction source, and a data input 28, which is connected to an output 32 of the complementation means 8 via data line 30. The complementation means 8 further comprises an input 34, which is connected via data line 36 to the data source, to which the first calculating unit 2 is connected via the data line 22, or another data source. The control means 6 and the complementation means 8 are effectively connected via control line 38.

The first calculating unit 2 and the second calculating unit 4, respectively, process data, which are supplied to it at the data, input 20 and 28, respectively, controlled by instructions, which are supplied to the instruction input 16 and 24, respectively. The complementation means 8 is controllable and switchable, respectively, i.e. it selectively outputs data, which it has received at input 34, complementation means switched off, or their complement (complementation means switched on) at its output 32. These two states of the complementation means 8 are controlled and switched, respectively, by control means 6 via control line 38. Further, control means 6 controls the first calculating unit 2 and the second calculating unit 4 to set several different modes of operation, which are discussed below in more detail with reference to FIG. 2-4.

Figure 2:
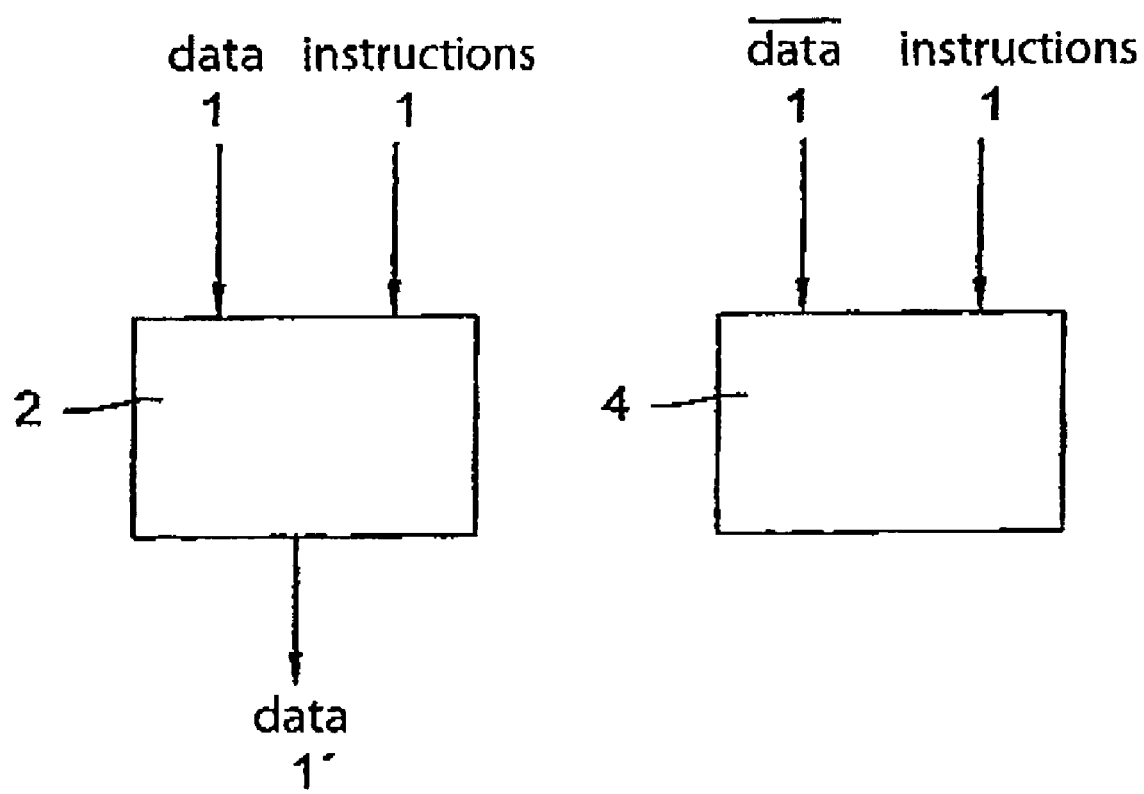
FIG. 2 is a schematical representation of a high-security mode of operation of the embodiment of FIG. 1.

FIG. 2 is a schematical illustration of a high-security mode of operation of the embodiment of FIG. 1. In this mode of operation, the first calculating unit 2 and the second calculating unit 4 receive the same instructions for processing data at the instruction input 16 and 24, respectively. Further, the same data are supplied to the first calculating unit 1 at the data input 20 and to the complementation means 8 at the input 34. The complementation means 8 is switched on, i.e. it outputs the complement of the data, which it receives at input 34, at the output 32. Thus, the second calculating unit 4 receives the complement of the data, which the first calculating unit 2 receives at its data input 28. In this high security mode of operation, the function of the processor according to the present embodiment corresponds to the dual rail logic, i.e. the preferably equally designed calculating units 2 and 4 process complementary data synchronously, controlled by the same instructions. In this high security mode of operation, a side channel attack via measuring the power consumption of the processor is rendered very difficult or almost impossible, since the power consumption of the first calculating unit and the second calculating unit together does not depend on the data due to processing complementary data. When the first calculating unit 2 and the second calculating unit 4 are arranged in spatial closeness to one another or intertwined with each other, further, a side channel attack via an analysis of the electromagnetic radiation of the processor is made significantly difficult, since due to processing the complementary data always in immediate proximity to one another, currents and voltages, respectively, occur, which correspond to a digital value and its complement.

Figure 3:
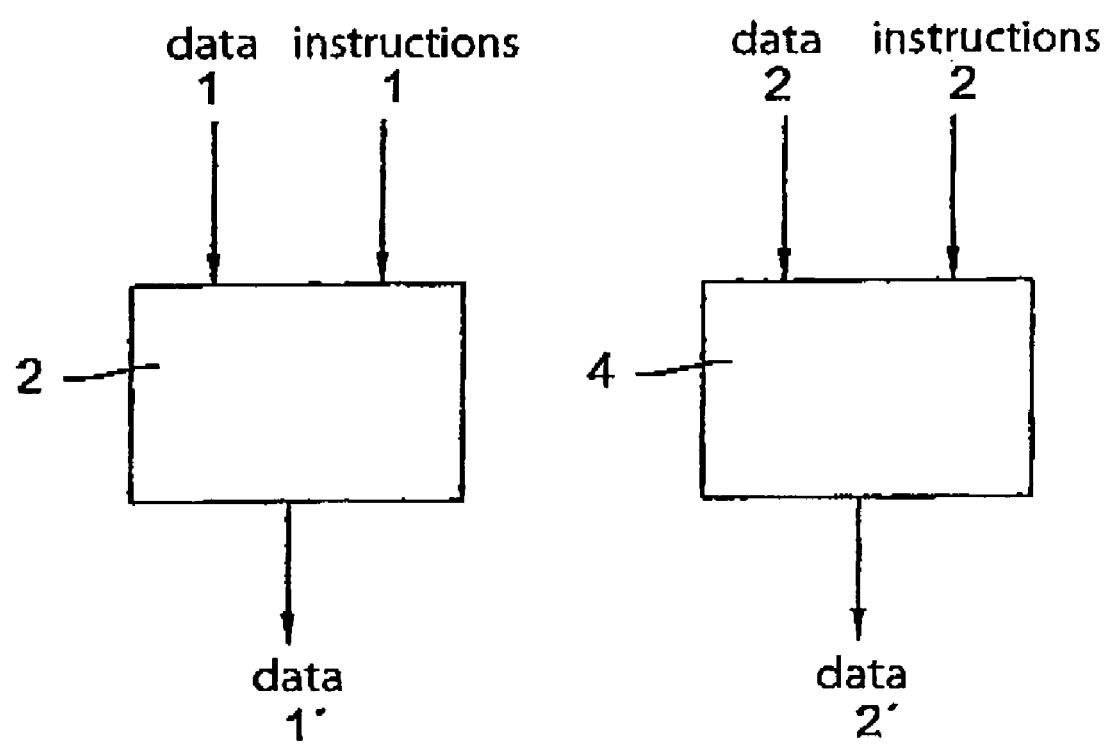
FIG. 3 is a schematical representation of a high-power mode of operation of the embodiment of FIG. 1.

FIG. 3 shows a high power mode of operation of the first calculating unit 2 and the second calculating unit 4. In this mode of operation, different data are supplied to the first calculating unit 2 and the second calculating unit 4 at their data inputs 20 and 28, and different instructions at their instruction inputs 16 and 24. By the parallel and synchronous, respectively, processing of different or the same data with different or the same instructions and programs, respectively, or program parts, the computing power of the processor according to this present embodiment doubles. Thus, the processor can process the double amount of data in the same time and with the same power consumption as in the high-security mode of operation, controlled by the double number of instructions. At the same time, however, this mode of operation does not provide the special protection against side channel attacks, which the high-security mode of operation discussed with regard to FIG. 2 provides. However, it provides the advantage of disguising the current profiles, as well as the electromagnetic radiation by parallel processing of different data.

Figure 4:
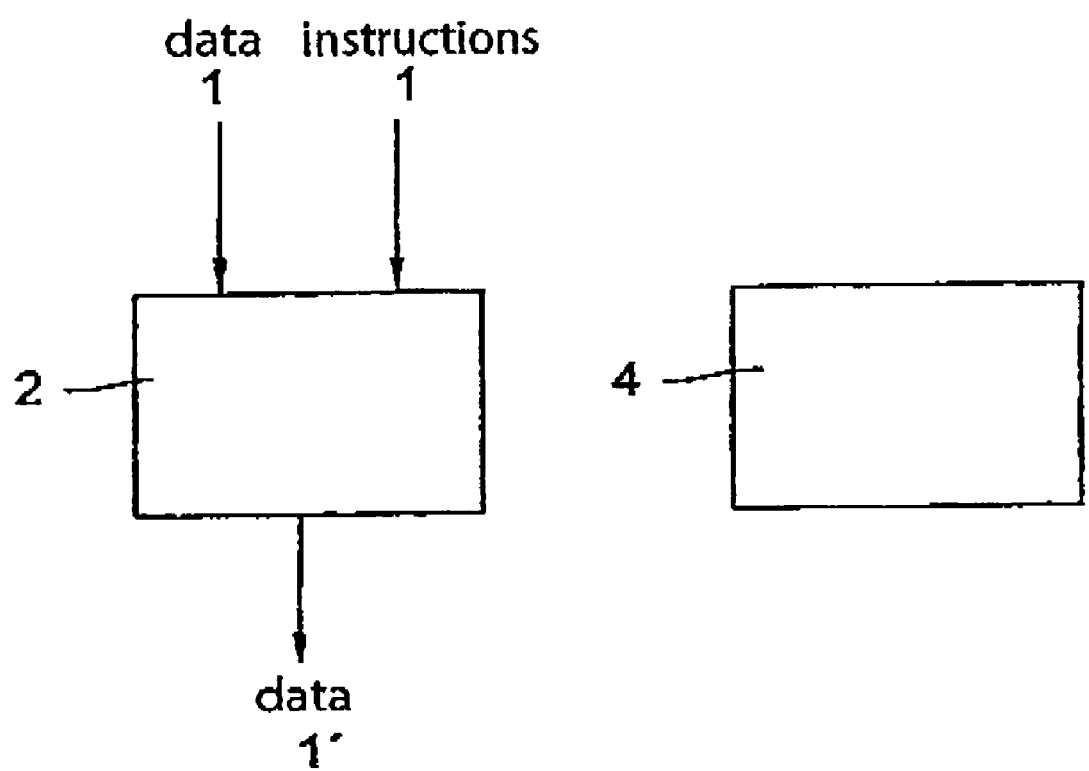
FIG. 4 is a schematical representation of a power saving mode of operation of the embodiment of FIG. 1.

FIG. 4 is a schematical illustration of a power saving mode of operation. In this mode of operation, one of the two calculating units, here the second calculating unit 4, is switched off and is not powered, respectively. The other calculating unit, here the first calculating unit 2, receives data and instructions, which it processes. In this mode of operation, the power consumption and the computing power of the two calculating units are halved in comparison to the high power mode of operation discussed with regard to FIG. 3. Like the high power mode of operation, the power saving mode of operation does not provide the special security against side channel attacks, which the high security mode of operation discussed with regard to FIG. 2 provides.

Figure 5:
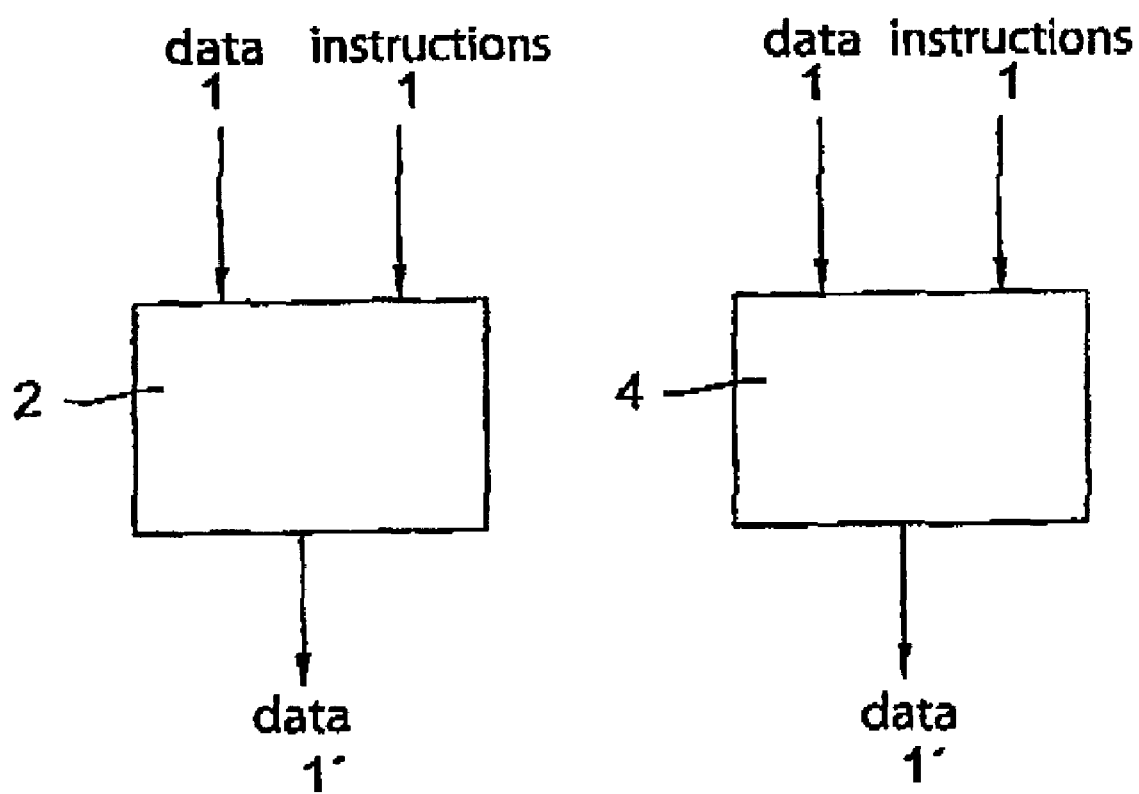
FIG. 5 is a schematical representation of a security mode of operation of the embodiment of FIG. 1.

FIG. 5 is a schematic illustration of a security mode of operation of the embodiment of FIG. 1. In this mode of operation, the first calculating unit 2 and the second calculating unit 4 receive the same instructions for processing data at the instruction input 16 and 24, respectively. Further, the same data are supplied to the first calculating unit 2 at the data input 20, and the complementation means 8 at the input 34. The complementation means 8 is switched off, i.e. it outputs the data, which it receives at the input 34 at the output 32. Thus, the second calculating unit 4 receives the same data at its data input 28, as the first calculating unit 2 receives at its data input 20. In this security mode of operation, the first calculating unit 2 and the second calculating unit 4 process synchronously the same data, controlled by the same instructions. The results output by the two calculating units are supplied to a comparator not illustrated in FIG. 1, which tests the output of the first calculating unit 2 and the output of the second calculating unit 4 for consistency and outputs a signal depending thereon, which can be used, for example, to control and to actuate, respectively, a repetition of processing the input data, a usage of default data and data instead of the output results, a plausibility test of the two output results, a temporary interruption or a total termination of the data processing by the calculating units or another default reaction. Thereby, the security mode of operation provides protection against a DFA.

Correspondingly, in the high-security mode of operation discussed below with reference to FIG. 2, a test for consistency of the results output by the first calculating unit 2 and the second calculating unit 4 can be performed.

The modes of operation illustrated with regard to FIGS. 2 to 5 are suited for different tasks, which a processor, such as a processor in a chip card or another cryptoprocessor often has to fulfill alternately or successively. When processing programs or program parts for authentication, for encryption or for access-protection a maximum security against attacks of unauthorized people, such as against side channel attacks, is required. The extent of these extremely security-relevant tasks is thereby often comparatively low. They are performed in the high security mode of operation, which offers maximum security and medium power.

In many applications, the biggest amount are operations and tasks of the processor, respectively, which have lesser or no demands on the security against attacks, whose processing in as little time as possible, however, is desired, such as to offer high comfort to a user and to spare him long waiting times. These operations can be performed in a high-power mode of operation, which offers a lesser degree of security against attacks, but a computing power doubled in comparison to the high security mode of operation.

Further, in numerous applications, tasks occur, where only a low or almost non-existent computing power is required, because an input of a user or information, which was requested from another means, is awaited in the program flow. These tasks can be performed in the power saving mode of operation, which combines the low computing power of the high security mode of operation with the low security of the high power mode of operation, but halves the power consumption of the calculating unit.

It is an advantage of an processor according to the present invention that by realizing two or three of the above-described mode of operations, particularly the high-security mode of operation together with the high-power mode of operation and/or the power-saving mode of operation, a flexible adaptation of security standard, computing power and power consumption is possible, wherein one can switch and change, respectively, dynamically between the mode of operation and during operation, respectively. Thus, for example, in the high-power mode of operation, a user can be requested to input a PIN, in the power saving mode of operation, an input of the PIN can be awaited, and subsequently it can be cryptographically processed in the high-security mode of operation.

For realizing a processor, which comprises, according to the present invention, two, three or four of the modes of operation discussed with reference to FIG. 2 to 5, the circuit illustrated in FIG. 1 of the first calculating unit 2, the second calculating unit 4, the control means 6 and the complementation means 8 is only an example. Alternatively to the illustration in FIG. 1, the complementation means 8 can be part of the second calculating unit 4 and its data input 28 can be downstream and/or a further complementation means can be provided in the data line 22 of the first calculating unit or in the first calculating unit 2. Depending on the architecture and the applied circuit of the calculating unit 2 and 4, respectively, further, a complementation means can possibly be omitted, because merely two lines have to be crossed for complementation.

The control means 6 can switch on and activate, respectively, the first calculating unit 2 and the second calculating unit 4 by the control lines 12 and 14 and (in the power saving mode of operation) switch them off and deactivate them, respectively, but it can alternatively do this via an access to the power supply of the two calculating units.

Supplying the same data via the data line 22 to the data input 20 of the first calculating unit 2 and via the data line 36 to the input 34 of the complementation means 8 is possible in different ways. For example, data from a data source can be supplied synchronously to the data input 20 of the first calculating unit 2 and to the input 34 in the complementation means 8 by a "data selector" not illustrated in FIG. 1, which is connected to data lines 22 and 36.

Alternatively, a data selector can be integrated in the control means 6. Then, departing from the illustration in FIG. 1, the control means 6 is connected to a data source, wherein the data input 20 of the first calculating unit 2 is connected to the control means 6 via a data line, and wherein the input 34 of the complementation means 8 is connected to the control means 6 via a data line. Depending on the required mode of operation, the control means 6 can then supply the same data synchronously to the first calculating unit 2 and via the complementing or not complementing complementation means 8 to the second calculating unit 4, or supply different data to the first calculating unit 2 and via the not complementation means 8 to the second calculating unit 4 or only supply data to the first calculating unit 2.

There are also different possibilities when supplying instructions via the instruction lines 18 and 26 to the instruction input 16 of the first calculating unit 2 and the instruction input 24 of the second calculating unit 4, respectively. The instruction input 16 of the first calculating unit 2 and the instruction input 24 of the second calculating unit 4 can be directly connected to one and the same or two different instruction sources via the instruction lines 18 and 26, respectively. Alternatively, an instruction source can be connected to the control means 6, which is connected via an instruction line to the instruction input 16 of the first calculating unit and via an instruction line to the instruction input 24 of the second calculating unit. The control means 6 supplies then, depending on the desired mode of operation, synchronously the same instructions or different instructions to the instruction input 16 of the first calculating unit 2 and the instruction input 24 of the second calculating unit 4, or only to one of the two calculating units 2 and 4.

The control means 6 for controlling the two calculating units 2 and 4 can be embodied in different ways and can be connected effectively to the first calculating unit 2, the, second calculating unit 4 and the complementation means 8, so that, depending on the desired mode of operation, the first calculating unit 2 and the second calculating unit 4 can synchronously process the same or different data and instructions, or so that one of the two calculating units 2 and 4 can be deactivated.

Further, a software realization of the modes of operation discussed above with regard to FIG. 2 to 4 and the alternation between them is possible. In this case, the processor has a first calculating unit 2 and a second calculating unit 4, and the control means is realized by instructions, which can be performed by the processor and the calculating units, respectively. The instruction input 16 of the first calculating unit 2 and the instruction input 24 of the second calculating unit 4 are connected to an instruction source and a program memory, such as a ROM (read only memory), respectively. The first calculating unit 2 and the second calculating unit 4 have one or several data inputs 20 and 28, respectively, wherein all data sources, which supply data to be processed in the high-security mode of operation, such as a user interface, by which a PIN is input by the user, are connected in parallel to the data input 20 of the first calculating unit and a data input 28 of the second calculating unit, such that the data of the data source are supplied to the first calculating unit 2, and synchronously, the complement of the data of the data source are supplied to the second calculating unit 4.

This can happen, as has already been discussed above with regard to the embodiment illustrated in FIG. 1, for example by a complementation means in the data line between the data source and the data input of the second calculating unit or, depending on the applied architecture of the calculating units, also by simply crossing data lines. The instruction source contains pairs of instructions, wherein one of the instructions is provided for the first calculating unit and supplied to it via an instruction input 16, and wherein the respective other instruction of the pair is provided for the second calculating unit 4, and supplied synchronously to it via the instruction input 24.

Program parts, which are provided for the high security mode of operation described above with regard to FIG. 2, have pairs of instructions, which each comprise two identical instructions. Program parts, which are provided for processing in the high-power mode of operation discussed with reference to FIG. 3, have pairs of instructions, which comprise two instructions to be processed simultaneously by the first calculating unit 2 and the second calculating unit 4, respectively. Program parts, which are provided for processing in the power saving mode of operation illustrated in FIG. 4, have pairs of instructions, which have an instruction to be processed for one of the calculating units 2 and 4, and for the respective other calculating unit an instruction not to be processed or a deactivation and switch-off instruction, respectively.

Thus, in program parts, which run in the high security mode of operation, the first calculating unit 2 and the second calculating unit 4 synchronously process complementary data from the same data source, controlled by the identical instructions. In program parts, which run in the high-power mode of operation, the first calculating unit 2 and the second calculating unit 4 process different data from one and the same or different data sources, controlled by generally different instructions. In program parts, which are provided for processing in the power-saving mode of operation, one of the two calculating units processes data controlled by instructions, and the other calculating unit is deactivated and switched off, respectively. In the case of three or more calculating units, a combination of the modes of operation is possible.

The above-illustrated embodiments can easily be extended to processors with more than two calculating units, preferably with an even number of calculating units, which are equal in pairs. In this case, all pairs of calculating units can operate in the same mode of operation or in different modes of operation. In the power-saving mode of operation, all calculating units except one can be switched off. In the case of three or more calculating units, a combination of the modes of operation is possible.

The present invention is suited for all processors, which can be used for cryptographical applications or security applications, and are to be protected from side channel attacks, such as for processors in chip cards.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Processor, comprising:
a first calculating unit having a data input and an instruction input;
a second calculating unit having a data input and an instruction input; and
a controllable complementation means, which is connected to the data input of the second calculating unit on the output side, for receiving data and for outputting the received data in a switched-off state and for outputting the complement of the received data in a switched-on state; and
a control means for controlling the two calculating units and such that they operate selectively in a high security mode of operation processing complementary data or in a parallel mode of operation processing independent data,
wherein the control means is formed to
put the complementation means in the high-security mode of operation to the switched-on state and to supply the same data to the data input of the first calculating unit and the complementation means, and the same instructions to the instruction input of the first calculating unit and the instruction input of the second calculating unit, such that the first and the second calculating unit process complementary data synchronously, and
put the complementation means in the parallel mode of operation to the switched-off state and supply first data to the data input of the first calculating unit and second data being independent of the first data to the data input of the second calculating unit, and
wherein the control means is further formed to set the high-security mode of operation for security-relevant program parts or programs, and to set the parallel mode of operation for comparatively less security-relevant program parts or programs.

2. Processor according to claim 1, further comprising:
a third calculating unit; and
a fourth calculating unit;
wherein the third calculating unit and the fourth calculating unit can be controlled by the control means such that they operate selectively in a high-security mode of operation processing complementary data or in a parallel mode of operation processing independent data.

3. Processor according to claim 1, further comprising:
a third calculating unit; and
a fourth calculating unit;
wherein the third calculating unit and the fourth calculating unit can be controlled by the control means such that they operate selectively in a high-security mode of operation processing complementary data or are in a power-saving mode of operation, wherein the third and/or the fourth calculating unit is switched off.

4. Processor according to claim 1, further comprising:
a third calculating unit; and
a fourth calculating unit;
wherein the third calculating unit and the fourth calculating unit can be controlled by the control means such that they operate selectively in a high security mode of operation processing complementary data or in security mode of operation processing the same data.

5. Processor according to claim 1, wherein the first calculating unit and the second calculating unit are disposed spatially adjacent or intertwined with each other.

6. Processor according to claim 1, wherein the processor is a cryptography or security processor.

7. Processor according to claim 1, wherein the control means is formed to switch dynamically between different modes of operation during operation of the processor.

8. Chip card with a processor according to claim 1.

9. Processor, comprising:
a first calculating unit having a data input and an instruction input;
a second calculating unit having a data input and an instruction input; and
a controllable complementation means, which is connected to the data input of the second calculating unit on the output side, for receiving data and for outputting the received data in a switched-off state and for outputting a complement of the received data in a switched-on state; and
a control means for controlling the two calculating units and such that they operate selectively in a high-security mode of operation processing complementary data or are in a power-saving mode of operation, wherein one of the calculating units is switched off,
wherein the control means is formed to
put the complementation means in the high-security mode of operation to the switched-on state and to supply the same data to the data input of the first calculating unit and the complementation means, and the same instructions to the instruction input of the first calculating unit and the instruction input of the second calculating unit, such that the first and the second calculating unit process complementary data synchronously, and
put the second calculating unit in the power-saving mode of operation in the switched-off state,
wherein the control means is further formed to set the high security mode of operation for security-relevant program parts or programs, and to set the power-saving mode of operation for less security-relevant program parts or programs.

10. Processor, comprising:
a first calculating unit having a data input and an instruction input;
a second calculating unit having a data input and an instruction input; and
a controllable complementation means, which is connected to the data input of the second calculating unit on the output side, for receiving data and for outputting the received data in a switched-off state and for outputting a complement of the received data in a switched-on state; and
a control means for controlling the two calculating units and such that they operate selectively in a high-security mode of operation processing complementary data or in security mode of operation processing the same data,
wherein the control means is formed to
put the complementation means in the high-security mode of operation to the switched-on state and to supply the same data to the data input of the first calculating unit and the complementation means, and the same instructions to the instruction input of the first calculating unit and the instruction input of the second calculating unit, such that the first and the second calculating unit process complementary data synchronously, and put the complementation means in the security mode of operation in a switched-off state and supply the same data to the data input of the first calculating unit and to the data input of the second calculating unit, and to supply the same instructions to the instruction input of the first calculating unit and to the instruction input of the second calculating unit, and wherein further a compare means is provided, which is formed to check an output of the first calculating unit and an output of the second calculating unit for consistency and to trigger a preset reaction in dependency thereon.

* * * * *

UNITED STATES PATENT AND TRADEMARK OFFICE
CERTIFICATE OF CORRECTION

| | | |
|---|---|---|
| PATENT NO. | : 7,290,289 B2 | Page 1 of 1 |
| APPLICATION NO. | : 10/764265 | |
| DATED | : October 30, 2007 | |
| INVENTOR(S) | : Marcus Janke et al. | |

It is certified that error appears in the above-identified patent and that said Letters Patent is hereby corrected as shown below:

On the title page item (56),

Under Other Publications, line 3, "Chip-Multprocessor" should read --Chip-Multiprocessor--

At column 2, line 16, "mode, of" should read --mode of--

At column 4, line 48, "FIG." should read --FIGS.--

At column 6, line 55, "FIG." should read --FIGS.--

At column 6, line 64, "unit" should read --units--

At column 7, line 57, "FIG." should read --FIGS.--

Signed and Sealed this

Fifteenth Day of April, 2008

JON W. DUDAS
*Director of the United States Patent and Trademark Office*